US 6,578,122 B2

(12) United States Patent
Beukema et al.

(10) Patent No.: US 6,578,122 B2
(45) Date of Patent: Jun. 10, 2003

(54) USING AN ACCESS KEY TO PROTECT AND POINT TO REGIONS IN WINDOWS FOR INFINIBAND

(75) Inventors: Bruce Leroy Beukema, Hayfield, MN (US); David F. Craddock, New Paltz, NY (US); Ronald Edward Fuhs, Rochester, MN (US); Thomas Anthony Gregg, Highland, NY (US); Renato John Recio, Austin, TX (US); Steven L. Rogers, Rochester, MN (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 09/798,183

(22) Filed: Mar. 1, 2001

(65) Prior Publication Data

US 2002/0124148 A1 Sep. 5, 2002

(51) Int. Cl.[7] .............................................. G06F 12/00
(52) U.S. Cl. ........................ 711/163; 711/152; 711/203; 711/206; 710/100; 709/216
(58) Field of Search ........................ 711/163–164, 152, 711/202–203, 205–209, 220–221; 709/216–217; 710/100, 52, 48, 260, 317; 713/200–201; 712/22; 714/4, 10, 12

(56) References Cited

U.S. PATENT DOCUMENTS

| | | | | | |
|---|---|---|---|---|---|
| 5,574,849 | A | * | 11/1996 | Sonnier et al. | 714/12 |
| 5,684,993 | A | * | 11/1997 | Willman | 709/107 |
| 5,915,088 | A | * | 6/1999 | Basavaiah et al. | 1/1 |
| 6,163,834 | A | * | 12/2000 | Garcia et al. | 711/206 |
| 6,349,380 | B1 | * | 2/2002 | Shahidzadeh et al. | 712/211 |

* cited by examiner

*Primary Examiner*—Do Hyun Yoo
*Assistant Examiner*—Nasser Moazzami
(74) *Attorney, Agent, or Firm*—Duke W. Yee; Mark E. McBurney; Christopher P. O'Hogan

(57) ABSTRACT

A method, system and program for controlling access to computer memory are provided. The present invention comprises receiving a work request from a user, wherein the work request comprises an index portion and a protection portion. The index portion of the work request is used to locate an element in an address translation and protection table. The protection portion of the work request is then compared with a protection key in the table element, and access to memory is granted only if the protection portion and protection key match.

24 Claims, 5 Drawing Sheets

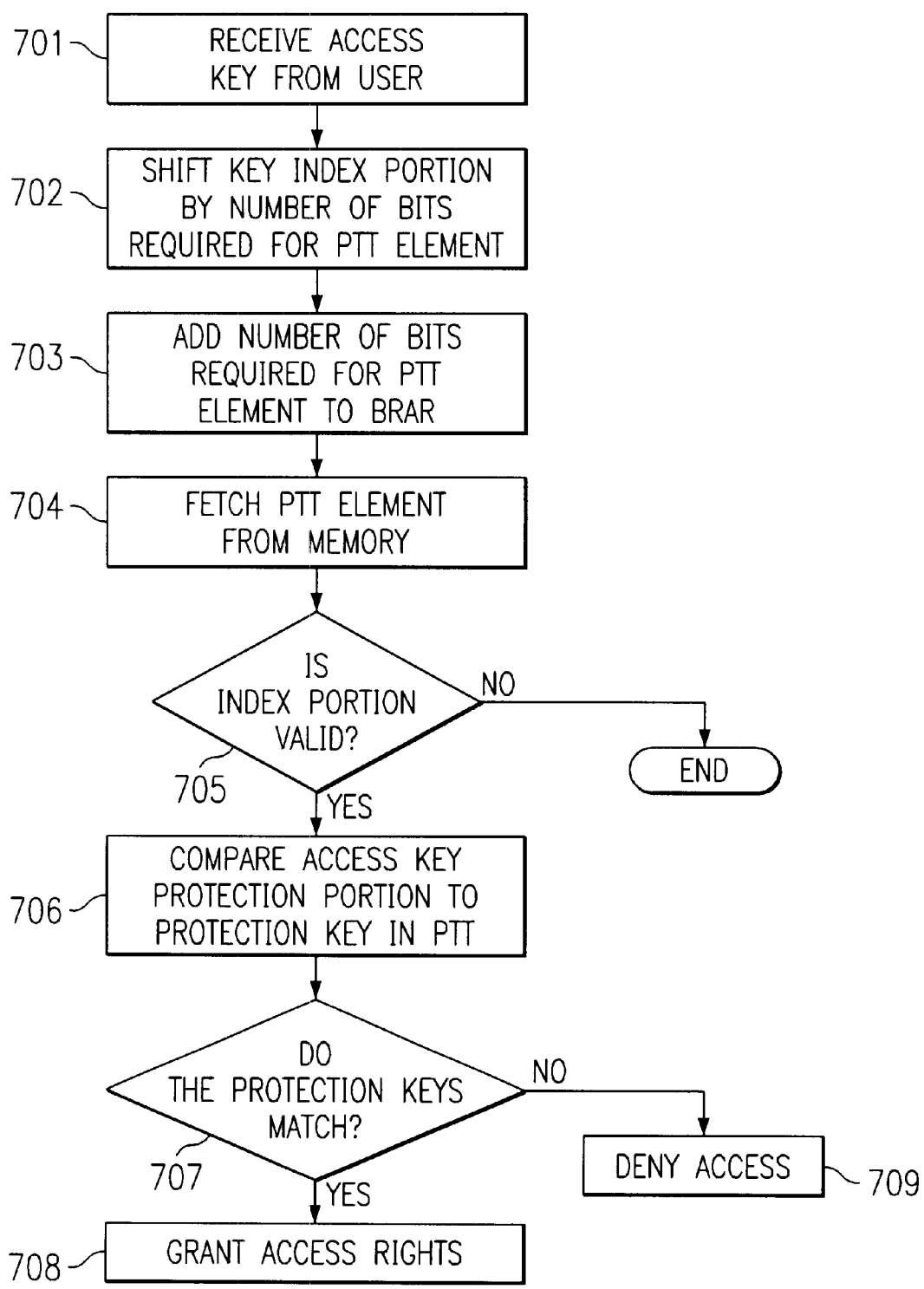

USING AN ACCESS KEY TO PROTECT AND POINT TO REGIONS IN WINDOWS FOR INFINIBAND

BACKGROUND OF THE INVENTION

1. Technical Field

The present invention relates to memory access in computer systems, and more specifically, how to control user access to particular areas of memory.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The channel interface (CI) interprets verbs and directly accesses the channel adapter.

The HCA transfers data received on Infiniband (IB) links directly to its host system main memory and also fetches data from system main memory to be transmitted on these IB links. Currently, there are no mechanisms to provide protection against unauthorized access of this memory or to point to specific areas (regions and windows) of memory, each of which uses its own translation tables to translate the virtual addresses that reference this memory into the real addresses that the CI hardware needs to directly access it.

Therefore, it would be desirable to have mechanisms to provide protection against unauthorized access of host system main memory, as well as mechanisms that point to specific areas of this memory, which translate virtual addresses for the memory into real addresses for the CI hardware.

SUMMARY OF THE INVENTION

The present invention provides a method, system and program for controlling access to computer memory. The present invention comprises receiving a work request from a user, wherein the work request comprises an index portion and a protection portion. The index portion of the work request is used to locate an element in an address translation and protection table. The protection portion of the work request is then compared with a protection key in the table element, and access to memory is granted only if the protection portion and protection key match.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart illustrating memory access through a Protection/Translation Table in accordance with the present invention.

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
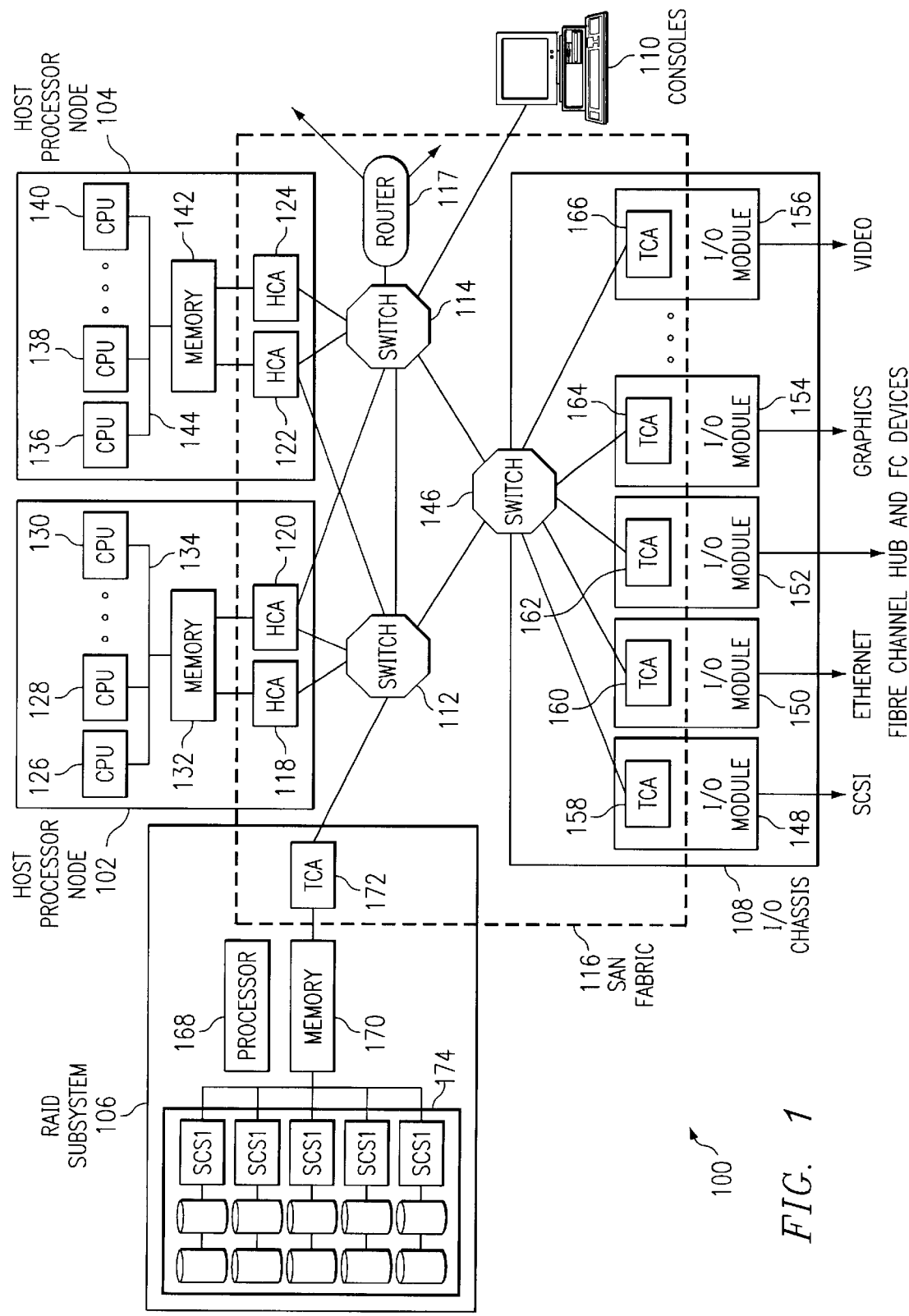
FIG. 1 is a diagram of a network computing system is illustrated in accordance with a preferred embodiment of the present invention.

With reference now to the figures and in particular with reference to FIG. 1, a diagram of a network global change computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

Figure 2:
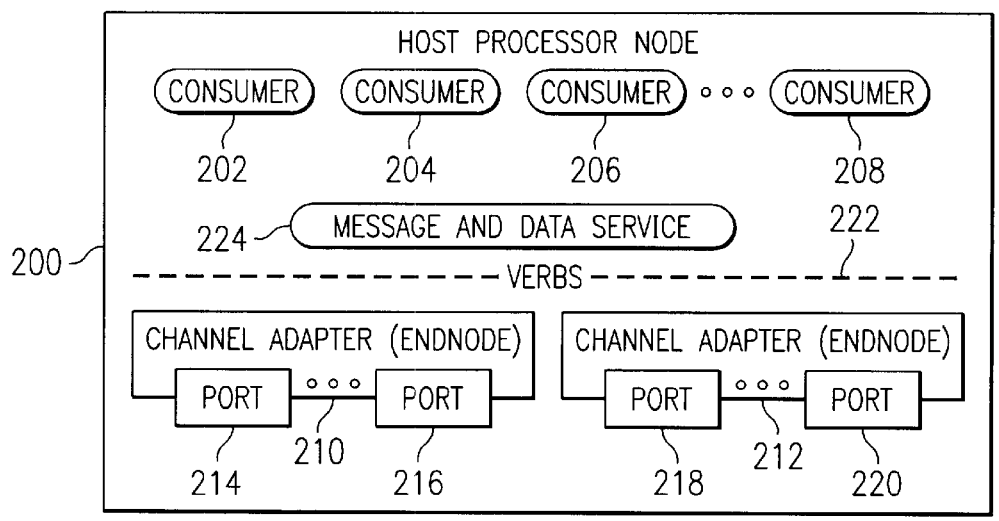
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
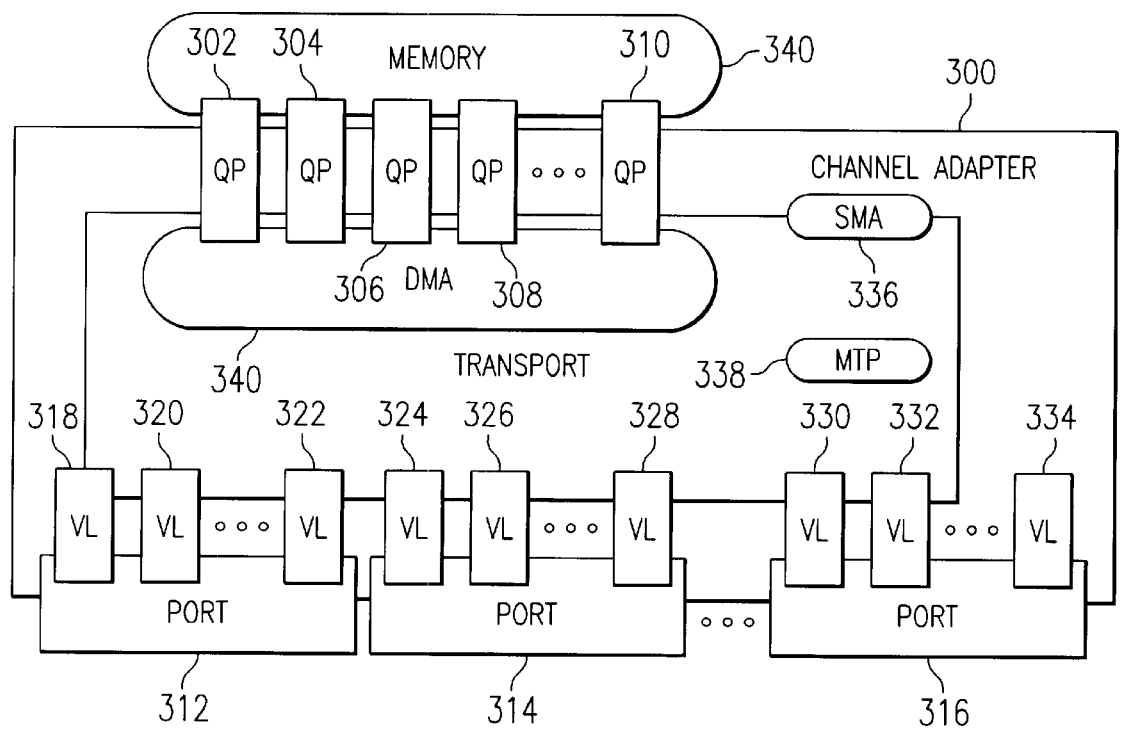
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
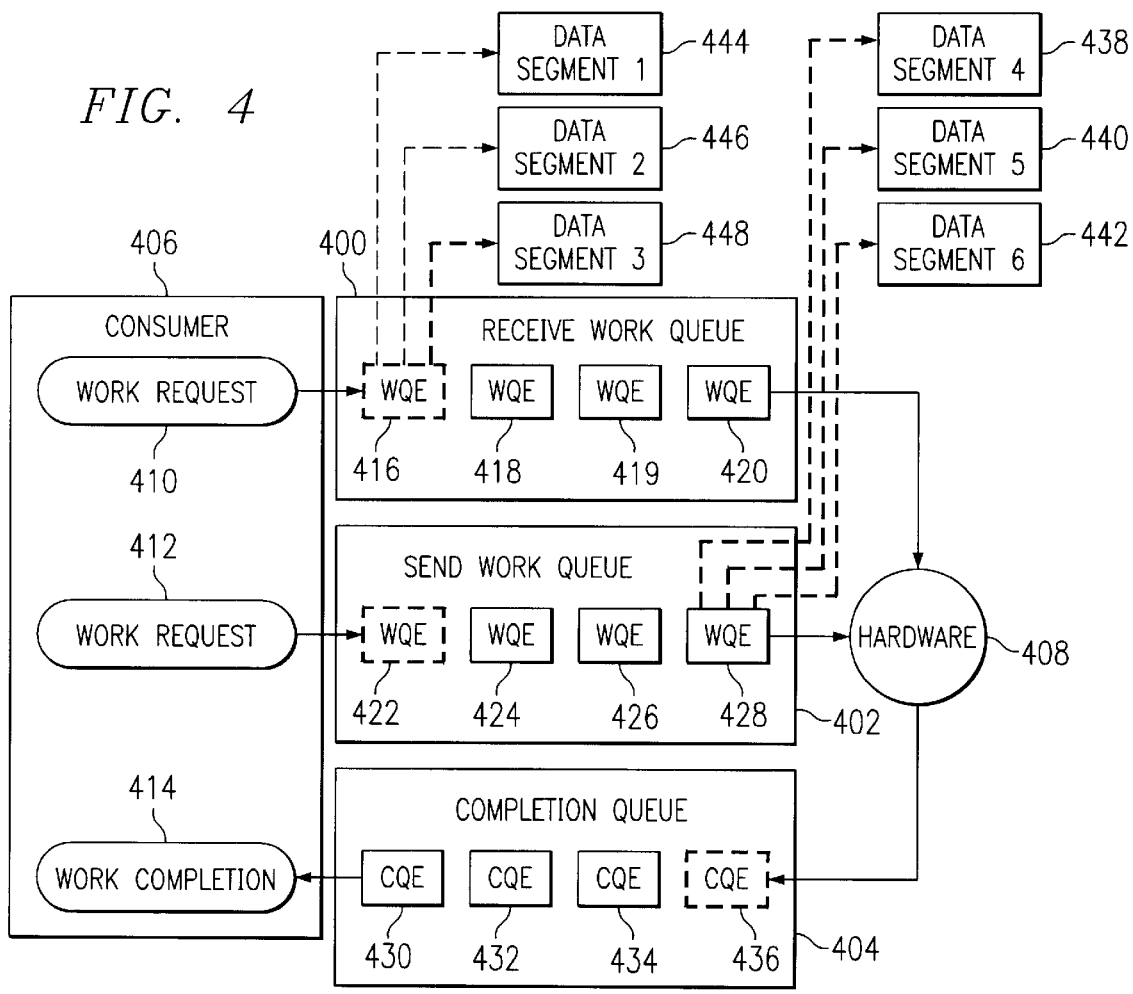
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

An Atomic Operation work queue element provides a memory semantic operation to perform an atomic operation on a remote word. The Atomic Operation work queue element is a combined RDMA Read, Modify, and RDMA Write operation. The Atomic Operation work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Reliable and Unreliable connected services associate a local queue pair with one and only one remote queue pair. Connected services require a process to create a queue pair for each process which is to communicate over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end—end (EE) context with one and only one remote end—end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 5:
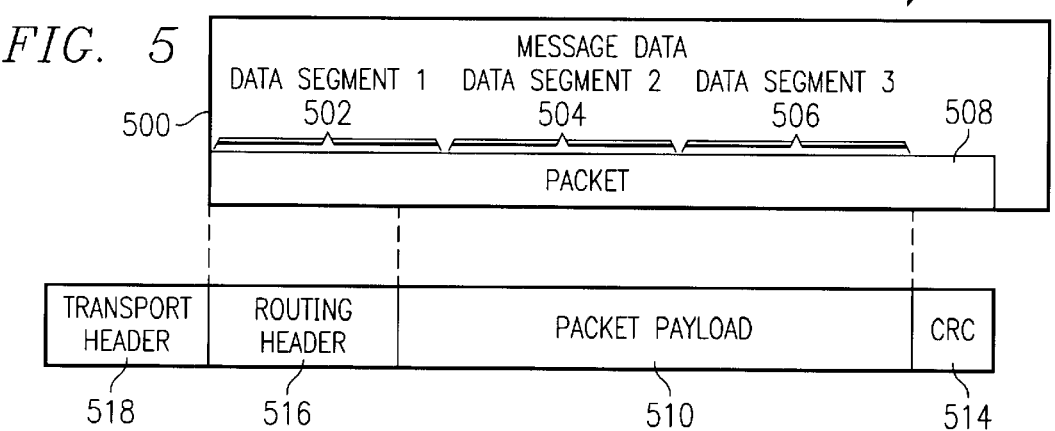
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport header 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

Each memory region has an associated Address Translation Table (ATT). The entries in the ATT are real addresses of the pages that make up part of the memory region. The entries are arranged in ascending order corresponding to the incrementing virtual address associated with the memory region. When the HCA hardware translates from a virtual address to a real address, it indexes into the ATT based on the virtual address offset into the memory region.

Both memory regions and memory windows are accessed through a Protection/Translation Table (PTT). Each memory window belongs to a memory region and defines a portion (or subset) of the region. For memory regions, each PTT Element contains a real address pointer to the beginning of each ATT in main memory. For memory windows, each PTT Element contains a pointer to the associated memory region. Also, each access to main memory includes either a Local Key (L_Key) or a Remote Key (R_Key) that is supplied by the user. The L_Keys and R_Keys are divided into two portions. The first portion is called the index and is used to index into the PTT, and the second portion is a protection key. The user provides the L_Key and R_Key and the HCA hardware uses the keys to find the PTT Element. Within each PTT Element is a protection key, and the HCA hardware compares this protection key to the second portion of the L_Key or R_Key. If the protection keys match, memory access may be given to the user depending on the particular access rights requested (i.e. Read, Write, or Atomic operation).

Figure 6:
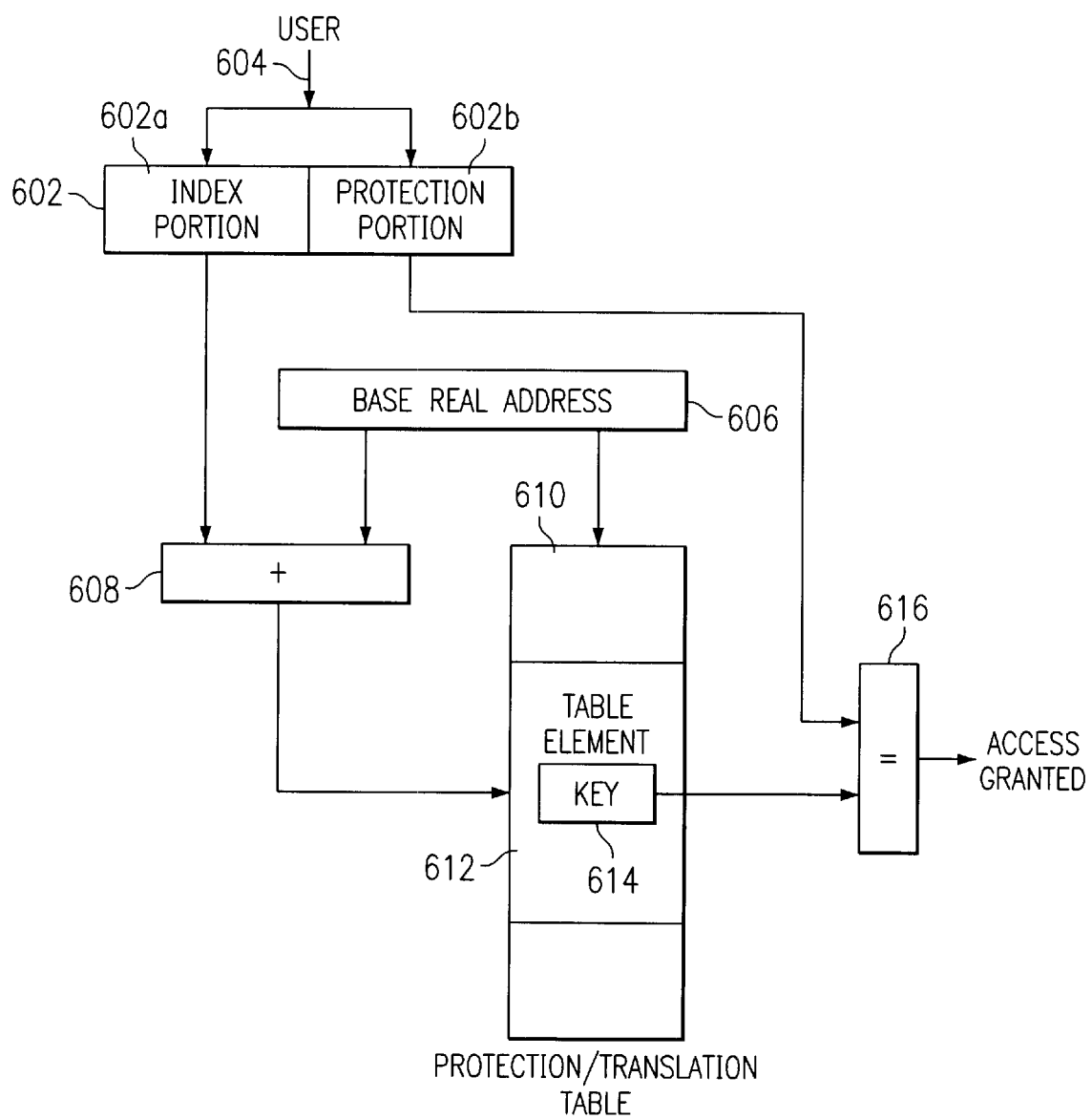
FIG. 6 depicts a schematic diagram illustrating memory access through a Protection/Translation Table in accordance with the present invention.

Referring to FIG. 6, a schematic diagram illustrating memory access through a Protection/Translation Table is depicted in accordance with the present invention. The hardware structure in FIG. 6 is part of a HCA. The HCA accesses main memory on behalf of its users in two cases. First, local users from the host system (the one to which the HCA is attached) supply work requests that are comprised of virtual addresses and byte counts. Collectively, these addresses and lengths are called scatter/gather lists. All access to main memory for a particular work request must be from the same memory region, and therefore use the same Address Translation Table (ATT). The user supplies a L_Key with each work request.

A second source for main memory access is from external users who are performing Remote Direct Memory Access (RDMA) and Atomic operations. These accesses may be for either a memory region or a portion of a region (memory window). In either case, the HCA translates these addresses using the same translation mechanisms that are used for local accesses. However, in this case, the external user supplies a R_Key for the incoming packets.

Referring to FIG. 7, a flowchart illustrating memory access through a Protection/Translation Table is depicted in accordance with the present invention. FIG. 6 shows that the user (internal or external) 604 supplies a Key (L_Key or R_Key) 602 to the HCA hardware when the user wants access to main memory (step 701). The Key 602 is divided into two portions: the index portion 602a and the protection portion 602b. The HCA hardware has a Base Real Address Register (BRAR) 606 that points to the beginning of the Protection/Translation Table (PTT) 610 which is in either main memory or HCA local memory (depending on the specific implementation). At the beginning of each access to main memory, the HCA shifts the Key index portion 602a to the left by the number of bits required for each PTT Element 612 (step 702). This number is the power of 2 representing the size of the PTT in bytes. For example, if each PTT is 64 bytes, the shift operation would be 6 bits (2 to the 6th power). The HCA then adds this number to the BRAR 606 using adder 608 (step 703). The resulting composite address is the base address (the first byte) of the PTT Element 612 in main or local memory for the memory region or window.

The HCA then uses this address from adder 608 to fetch the PTT Element 612 from memory (step 704). Within each PTT Element 612 is a protection key 614, along with other validity and access rights information.

The HCA hardware first checks that the index 602a is valid (step 705), meaning the corresponding PTT 610 actually exists. This check is performed because empty, invalid or unused PTT's might be interspersed among the valid ones. If the index 602a is valid, the HCA then uses the comparator hardware 616 to compare the L_Key protection portion 602b to the protection key 614 in the PTT Element 612 (step 706). If the comparator 616 determines that the protection keys 602b and 614 match (step 707), the access rights are granted to the user (step 708). If protection keys 602b and 614 do not match, access is denied (step 709). Finally, the PTT Element 612 also contains specific access rights information describing the types of main memory operation that the user is allowed (i.e. Read, Write, Atomic operations).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling access to computer memory, comprising:

receiving a work request from a user, wherein the work request comprises an index portion and a protection portion;

locating an element in an address translation and protection table by means of the index portion of the work request;

comparing the protection portion of the work request with a protection key in the table element, wherein the table element is associated with a memory region and comprises a pointer to a real address in an address translation table in main memory; and granting access to memory only if the protection portion and protection key match.

2. The method according to claim 1, wherein the work request is a local access key.

3. The method according to claim 1, wherein the work request is a remote access key.

4. The method according to claim 1, wherein the step of locating the element in the address translation and protection table further comprises combining a virtual address within the index portion of the work request with a real address, wherein the real address is stored in a base real address register.

5. A method for controlling access to computer memory, comprising:

receiving a work request from a user, wherein the work request comprises an index portion and a protection portion;

locating an element in an address translation and protection table by means of the index portion of the work request;

comparing the protection portion of the work request with a protection key in the table element, wherein the table element is associated with a memory window and comprises a pointer to a memory region in which the memory window is contained; and granting access to memory only if the protection portion and protection key match.

6. The method according to claim 5, wherein the work request is a local access key.

7. The method according to claim 5, wherein the work request is a remote access key.

8. The method according to claim 5, wherein the step of locating the element in the address translation and protection table further comprises combining a virtual address within the index portion of the work request with a real address, wherein the real address is stored in a base real address register.

9. A computer program product for use in a data processing system, for controlling access to computer memory, the computer program product comprising:

first instructions for receiving a work request from a user, wherein the work request comprises an index portion and a protection portion, and wherein the work request is a local access key;

second instructions for locating an element in an address translation and protection table by means of the index portion of the work request;

third instructions for comparing the protection portion of the work request with a protection key in the table element, wherein the table element is associated with a memory region and comprises a pointer to a real address in an address translation table in main memory; and fourth instructions for granting access to memory only if the protection portion and protection key match.

10. The computer program product according to claim 9, wherein the work request is a local access key.

11. The computer program product according to claim 9, wherein the work request is a remote access key.

12. The computer program product according to claim 9, wherein the instructions for locating the element in the address translation and protection table further comprises computer program product combining a virtual address within the index portion of the work request with a real address, wherein the real address is stored in a base real address register.

13. A computer program product for use in a data processing system, for controlling access to computer memory, the computer program product comprising:

first instructions for receiving a work request from a user, wherein the work request comprises an index portion and a protection portion, and wherein the work request is a local access key;

second instructions for locating an element in an address translation and protection table by means of the index portion of the work request;

third instructions for comparing the protection portion of the work request with a protection key in the table element, wherein the table element is associated with a memory window and comprises a pointer to a memory region in which the memory window is contained; and fourth instructions for granting access to memory only if the protection portion and protection key match.

14. The computer program product according to claim 13, wherein the work request is a local access key.

15. The computer program product according to claim 13, wherein the work request is a remote access key.

16. The computer program product according to claim 13, wherein the instructions for locating the element in the address translation and protection table further comprises computer program product combining a virtual address within the index portion of the work request with a real address, wherein the real address is stored in a base real address register.

17. A system for controlling access to computer memory, comprising:

a receiver to receive a work request from a user, wherein the work request comprises an index portion and a protection portion;

a locator to locate an element in an address translation and protection table by means of the index portion of the work request;

a comparator to compare the protection portion of the work request with a protection key in the table element, wherein the table element is associated with a memory region and comprises a pointer to a real address in an address translation table in main memory; and a security component to grant access to memory only if the protection portion and protection key match.

18. The system according to claim 17, wherein the work request is a local access key.

19. The system according to claim 17, wherein the work request is a remote access key.

20. The system according to claim 17, wherein the locator further comprises an adder to combine a virtual address within the index portion of the work request with a real address, wherein the real address is stored in a base real address register.

21. A system for controlling access to computer memory, comprising:

a receiver to receive a work request from a user, wherein the work request comprises an index portion and a protection portion;

a locator to locate an element in an address translation and protection table by means of the index portion of the work request;

a comparator to compare the protection portion of the work request with a protection key in the table element, wherein the table element is associated with a memory window and comprises a pointer to a memory region in which the memory window is contained; and a security component to grant access to memory only if the protection portion and protection key match.

22. The system according to claim 21, wherein the work request is a local access key.

23. The system according to claim 21, wherein the work request is a remote access key.

24. The system according to claim 21, wherein the locator further comprises an adder to combine a virtual address within the index portion of the work request with a real address, wherein the real address is stored in a base real address register.

* * * * *

UNITED STATES PATENT AND TRADEMARK OFFICE
CERTIFICATE OF CORRECTION

PATENT NO. : 6,578,122 B2
DATED : June 10, 2003
INVENTOR(S) : Beukema et al.

It is certified that error appears in the above-identified patent and that said Letters Patent is hereby corrected as shown below:

Title page, Item [54] and Column 1, line 1,
Delete "USING AN ACCESS KEY TO PROTECT AND POINT TO REGIONS IN WINDOWS FOR INFINIBAND" and insert -- USING AN ACCESS KEY TO PROTECT AND POINT TO REGIONS OR WINDOWS OF A MEMORY FOR INFINIBAND --.

Title page,
Item [74], *Attorney, Agent, or Firm*, delete "O'Hogan" and insert -- O'Hagan --.

Signed and Sealed this

Twenty-fourth Day of August, 2004

JON W. DUDAS
*Director of the United States Patent and Trademark Office*